United States Patent [19]

Hartwick et al.

[11] 4,036,251
[45] July 19, 1977

[54] FLUID COMPRESSOR VALVE

[75] Inventors: William F. Hartwick; Charles H. Melcher, both of Mount Vernon, Ohio

[73] Assignee: Cooper Industries, Inc., Houston, Tex.

[21] Appl. No.: 684,625

[22] Filed: May 10, 1976

[51] Int. Cl.² .................................................. F16K 15/02
[52] U.S. Cl. .............................. 137/512.1; 137/512.5; 137/527
[58] Field of Search .................. 137/512.1, 512.5, 527

[56] References Cited

U.S. PATENT DOCUMENTS

| 1,599,414 | 9/1926 | Huff | 137/512.1 |
| 2,590,976 | 4/1952 | Kalitnsky | 137/512.15 |
| 2,636,510 | 4/1953 | Mercier et al. | 137/512.1 |

Primary Examiner—William R. Cline
Attorney, Agent, or Firm—Oliver E. Todd, Jr.

[57] ABSTRACT

An improved straight flow check valve construction is disclosed for use as intake and discharge valves in fluid compressors and other similar applications. The valve includes a valve inlet block and a valve outlet block which are attached together at generally planar abutting surfaces. A valve stop insert is positioned therebetween in a recess formed in the inlet block. At least one pair of valve ports extends through the inlet block, the valve stop insert and the outlet block and such ports are shaped to have elongated parallel cross sections in a plane perpendicular to the ports. Each port is closed by a separate valve plate. The valve plates for each pair of ports are mounted in the inlet block between the two ports for pivoting between closed and open positions and a single elongated V-shaped spring extends between the two valve plates for simultaneously biasing both valve plates to the closed positions. When the valve plates are in the open positions, the ports are streamlined.

9 Claims, 5 Drawing Figures

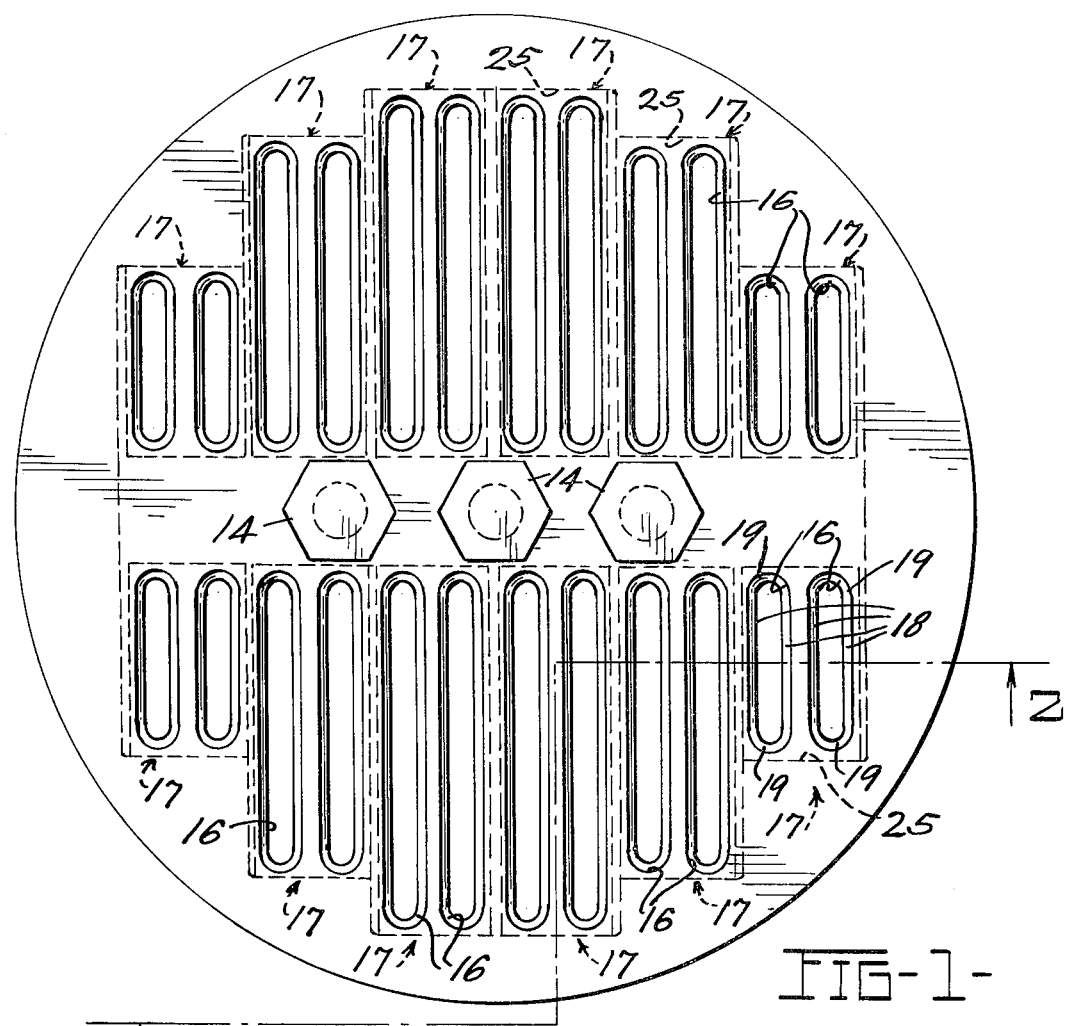
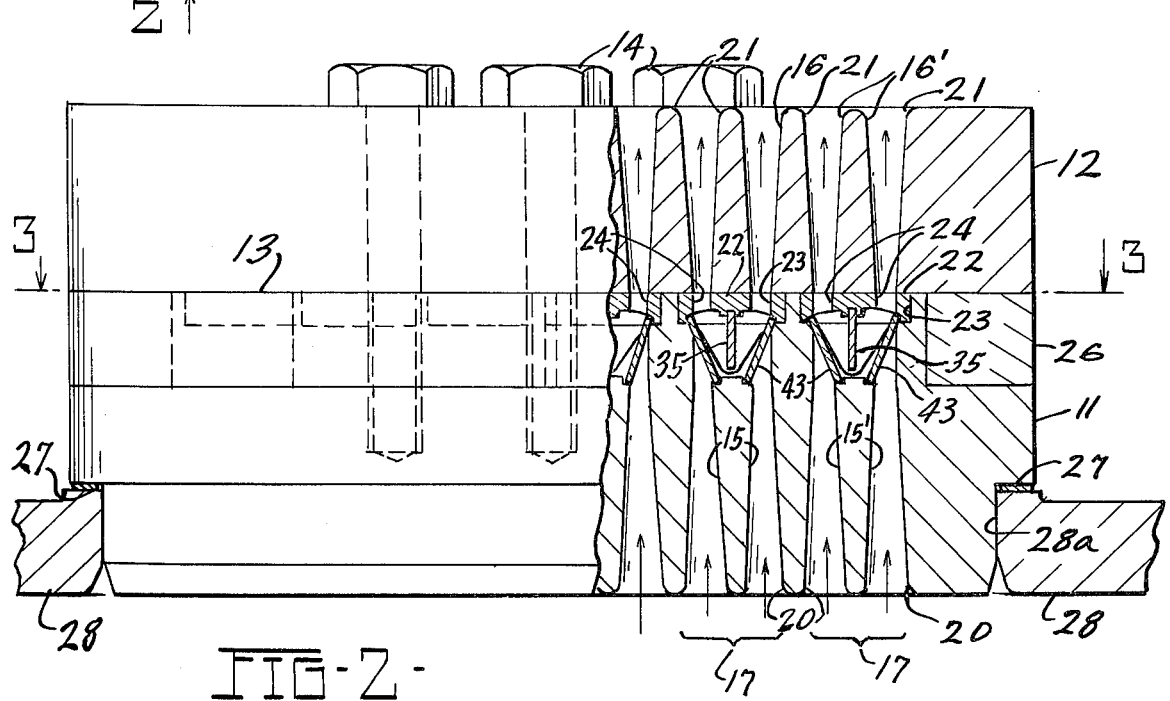

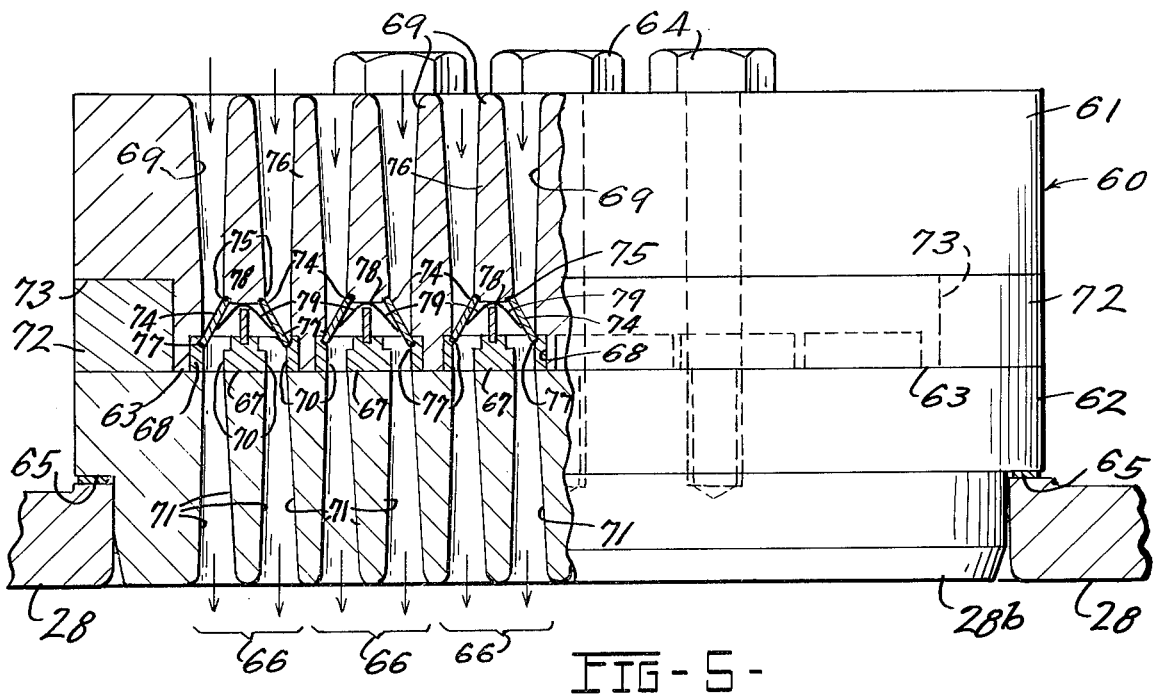
FIG-5-
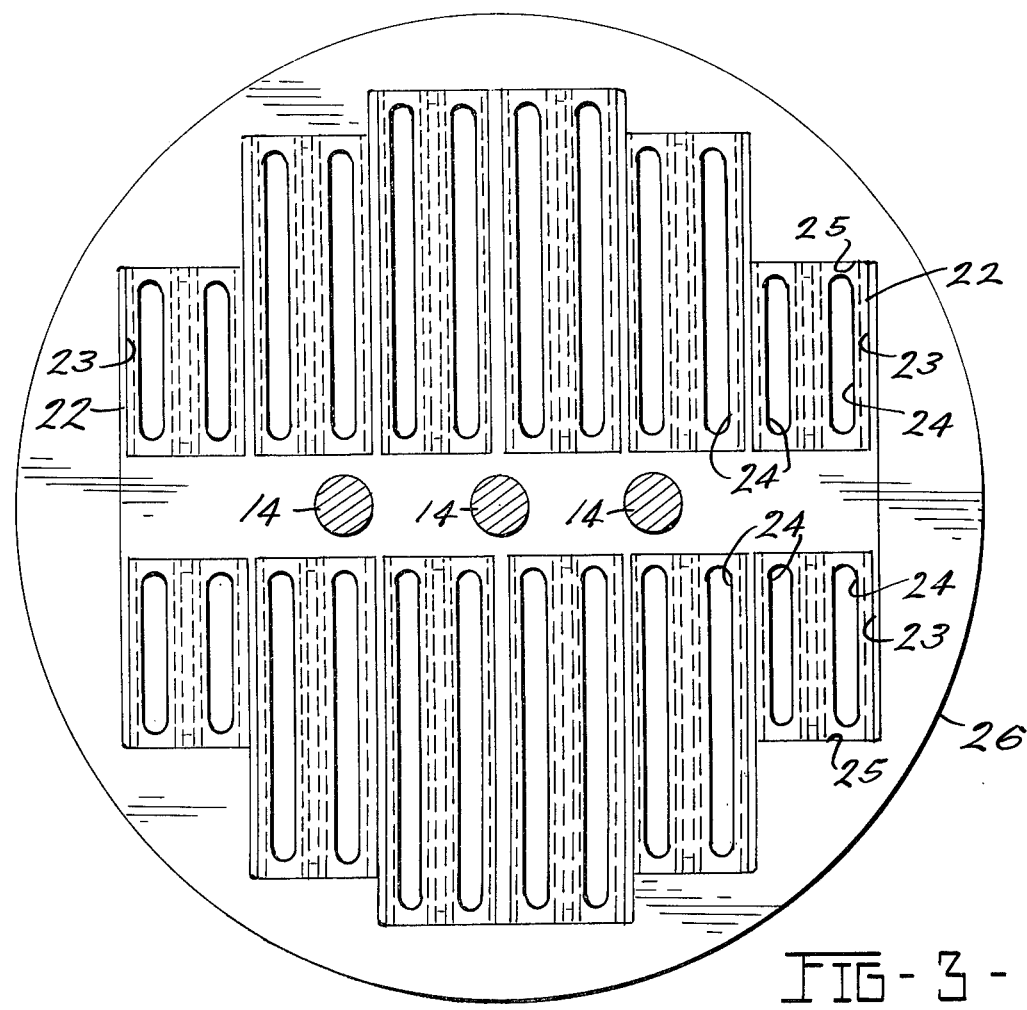
FIG-3-

U.S. Patent July 19, 1977 4,036,251
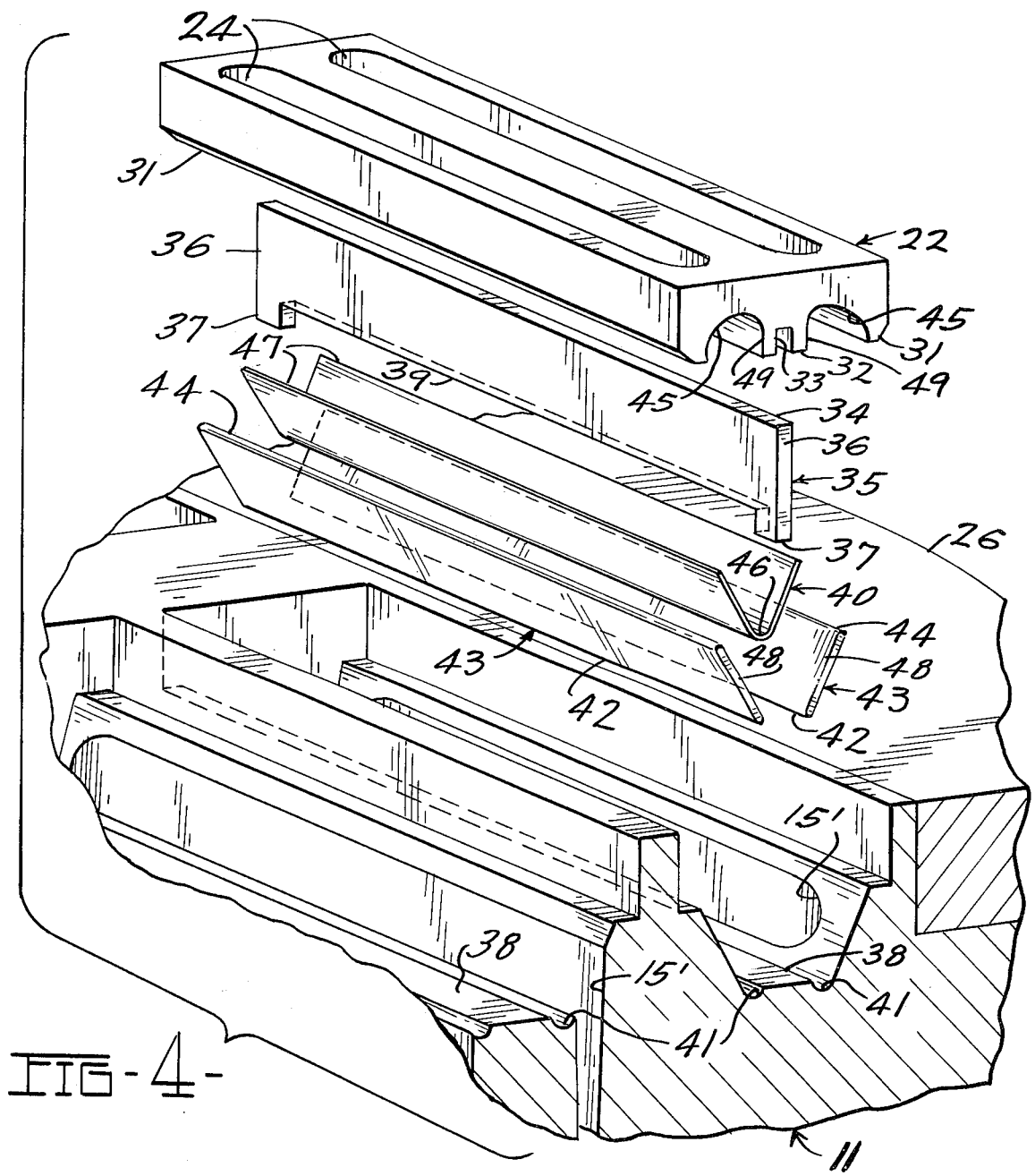
FIG-4-

FLUID COMPRESSOR VALVE

BACKGROUND OF THE INVENTION

This invention relates to check valves and more particularly to an improved straight flow one-way valve construction for use as intake and discharge valves in fluid compressors and the like.

Various types of valves are used in fluid compressors such as those of the reciprocating piston type. In one prior art fluid compressor, a cam is driven in synchronism with the piston for alternately opening an intake valve during an intake or suction stroke of the piston and opening a discharge valve during the compression stroke of the piston. However, such an arrangement requires lubrication for the cam and the valve actuating mechanism and is subject to failure if not provided with necessary maintenance.

Another prior compressor valve is in the form of a check valve which passes fluid in only one direction. One of two check valves is oriented to allow fluid to flow into the cylinder during the intake stroke while the other valve is oriented to allow fluid to flow from the cylinder during the compression stroke. One type of check valve commonly used in large compressors is provided with concentric annular openings. Springs are positioned to bias cooperating annular flat rings or discs to cover the openings, thereby preventing fluid flow through the valve in one direction. In the other direction, the rings or discs are lifted from their seats as fluid is forced through the valve. However, the fluid is required to flow through a tortuous path in such valves. The tortuous path results in a pressure drop across the valve, which in turn considerably reduces the efficiency of the compressor. A typical valve of this type is shown, for example, in U.S. Pat. No. 3,273,591 which issued Sept. 20, 1966 to Stewart.

Still another type of compressor valve is the form of a check valve having a straight through flow path for minimizing pressure drops across the valve. One straight flow check valve incorporates resilient valve flaps which are deflected as fluid is forced through the valve. Such a valve is shown, for example, in U.S. Pat. No. 2,590,976 which issued Apr. 1, 1952 to Kalitinsky. A modification of the straight through flow check valve is shown in Mercier et al. U.S. Pat. No. 2,636,510 in which straight through fluid passages are blocked by rigid plates pivoted from one wall of such passages. When the valve plates are pivoted opened, their trailing edges project into the flow path. As a consequence, the flow catches the projecting edges to pivot the valve plates closed when the flow direction is reversed. The projecting trailing edge of each open valve plate produces an irregular shape to the fluid flow path. This causes turbulence as fluid flows through the check value. Such turbulence results in an increased pressure drop across the check valve and thereby reduces the efficiency of the compressor.

SUMMARY OF THE INVENTION

According to the present invention, an improved check valve is provided for use as intake and discharge valves in fluid compressors, and the like. The check valve is provided with a plurality of straight streamlined flow paths which minimize the pressure drop across the valve and thus increase the efficiency of the compressor. The valve design results in a pressure drop on an order of magnitude of one-fifth of the pressure drop across a conventional ring or disc valve of the same outside diameter.

The valve of the present invention generally comprises a valve inlet block and a valve outlet block which are attached together at generally planar abutting surfaces. At least one valve stop insert is positioned between the inlet and outlet blocks in a recess formed in the inlet block. For each valve stop insert, a pair of valve ports extends through the inlet block, the valve stop insert and the outlet block. The valve ports in each pair are shaped to have elongated parallel cross sections in a plane perpendicular to the direction of the ports. A separate rigid valve plate is provided to close each port. The valve plates for each pair of ports are mounted in the inlet block between the two ports for pivoting between closed and open positions. When a valve plate is in the closed position, its associated port is blocked to prevent fluid flow therethrough. In the open position, the valve plate forms a portion of the wall of its associated valve port and is recessed such that the valve port is streamlined to minimize pressure drops across the valve. An elongated V-shaped spring is provided for each pair of valve ports and extends between the two valve plates and over a spring retainer positioned between the valve stop insert and the inlet block. The spring simultaneously biasing both valve plates to the closed positions. Preferably, the portions of the valve ports in the inlet block and the portions of the valve ports in the outlet block are tapered to provide controlled velocity changes in gas flowing through such valve ports. In addition, the entrance and exit edges of all ports are provided with a small radius. This minimizes the pressure drop across the open valve and further increases the efficiency of the compressor.

Accordingly, it is an object of the invention to provide an improved check valve construction.

Another object of the invention is to provide an improved fluid inlet and fluid discharge valve construction for fluid compressors in which fluid flow is along a straight streamlined flow path to minimize pressure drop across the valve.

Other object and advantages of the invention will become apparent from the following detailed description, with reference being made to the accompanying drawings.

BRIEF DESCRIPTION OF THE DRAWINGS

FIG. 1 is a top plan view showing the exhaust side of an improved straight flow one-way discharge valve construction for fluid compressors in accordance with the present invention;

FIG. 2 is a fragmentary, cross-sectional view taken along line 2—2 of FIG. 1;

FIG. 3 is a cross-sectional view taken along line 3—3 of FIG. 2;

FIG. 4 is an enlarged exploded fragmentary view showing the assembly of one section of the valve of the present invention; and FIG. 5 is a fragmentary, cross-sectional view, similar to FIG. 2, of a modified embodiment of the one-way valve of the present invention adapted for use as an inlet valve for fluid compressors.

DESCRIPTION OF THE PREFERRED EMBODIMENTS

Turning now to the drawings and particularly to FIGS. 1 through 3, details are shown for a fluid discharge or exhaust valve 10 constructed in accordance with the present invention. The valve 10 is designed for use in the exhaust side or outlet side of a fluid compressor, although other uses will be apparent to those skilled in the valve art. The valve 10 generally includes a housing consisting of a valve inlet block 11 and a valve outlet block 12 which are abutting at a generally planar interface 13 and are held together by means of a plurality of bolts 14. The bolts 14 are passed through the valve outlet block 12 and threaded into the valve inlet block 11 for holding the blocks 11 and 12 together. The valve outlet block 12 is provided with an annular shoulder 27 for seating in a cooperating pocket 28a in a compressor head 28.

A plurality of fluid passages or ports 15 extend through the valve inlet block 11 and are aligned with corresponding ports 16 in the valve outlet block 12. The aligned ports 15 and 16 are arranged in pairs 17. The valve 10 includes at least one pair of the aligned ports 15 and 16 and may include any number which conveniently fills the surface area of the valve 10. Preferably, the ports 15 in the valve inlet block 11 and the ports 16 in the valve exhaust or outlet block 12 cover at least 20% of the total surface area of the valve. As the surface area of the ports through the valve 10 is increased, the pressure drop across the valve 10 decreases. Prior art valves of the type having annular ports which are closed by spring loaded flat rings or annular plates typically have a port area covering at most 25% of the surface area of such valves. When the valve 10 is provided with ports covering only 20% of the surface area, such valve 10 is more efficient than the prior art annular valves having a 25% port area due to the lower pressure drop across the valve 10.

For the following, detailed description will be provided for one pair 17' of aligned ports 15' and 16' in the blocks 11 and 12, respectively. However, it will be appreciated that the described components relating to this pair of ports 17' applies equally to the other ports 17, with changes being primarily in dimensions to maximize the port area in the valve 10. As best seen in FIG. 1, the ports 16' forming the pair 17' have a cross section, in a direction parallel with the interface 13 between the blocks 11 and 12, which is elongated having parallel sides 18 and rounded ends 19. The ports 15 and 16 are all tapered to diverge in an outwardly direction from the interface 13. The ports 15 are provided with small radii 20 at their entrance and the ports 16 are provided with small radii 21 at their exits to minimize pressure drop across the valve 10.

For each pair of ports 17, a valve stop insert 22 is positioned within a recess 23 in the valve inlet block 11 and is clamped firmly in place between the valve inlet block 11 and the valve outlet block 12. Each insert 22 is provided with two port openings 24 which are aligned with and connect the two ports 15 in the valve inlet block 11 with their associated ports 16 in the valve outlet block 12. The recesses 23 holding the valve stop inserts 22 have an open end 25. After the inserts 22 are placed within the recesses 23, a retainer 26 is placed over the valve inlet block 11 for preventing the inserts 22 from moving longitudinally in the recesses 23.

Construction details of the individual valves are shown in the exploded view of the single exemplary pair 17' of ports in FIG. 4, in addition to FIGS. 1–3. The valve stop insert 22 is provided with two ports 24, each of which aligns with a port 15' in the valve inlet block 11 and a port 16' in the valve outlet block 12. The insert 22 has a generally flat rectangular shape and may be provided with chamfers 31 along lower edges to facilitate insertion into the valve inlet block recess 23. The insert 22 also includes centered between the ports 24 along its lower surface 32 an elongated slot 33 adapted to receive an upper edge 34 of a spring retainer 35. The spring retainer 35 extends substantially the full length of the recess 23 and includes at opposed ends 36 lower edge extensions 37 which abut against a web 38 in the inlet block 11 which is located between the pair 17' of ports 15'. When the spring retainer 35 is positioned in the slot 33 of the valve stop insert 22 and the valve stop insert 22 is inserted within the recess 23, the spring retainer 35 is clamped firmly in place between the valve stop insert 22 and the web 38. When the spring retainer 35 is so positioned, an edge 39 between the lower edge extensions 37 is spaced from the inlet housing web 38 to form a narrow elongated opening for passing a spring 40.

Between the ports 15' in the inlet block 11, grooves 41 are formed in the web 38 for receiving lower edges 42 of a pair of elongated flat valve plates 43. The valve plates 43 are received in the grooves 41 such that they pivot on the edges 42. The valve plates 43 are also provided with upper edges 44 which sweep across arcuate surfaces 45 formed on the valve stop insert 22. The arcuate surfaces 45 are positioned and are of dimensions which permit the valve plates 43 to pivot between first positions wherein the pair 17' of valve ports 15' are blocked and second positions wherein such ports 15' are clear or open to permit uninhibited fluid flow through the valve 10. The spring 40 has a generally elongated V-shaped with a bend or bight 46 formed along the center between two outwardly sloping sides 47. The spring is positioned over the spring retainer 35 such that the bight 46 engages and extends along the spring retainer edge 39 and the sloping sides press against inner sides 48 of the two valve plates 43 for simultaneously biasing such valve plates 43 towards the first positions wherein the pair 17' of ports 15' are blocked.

When the valve plates 43 are pivoted to the second position by fluid flowing through the ports 15', the upper edges 44 abut against surfaces 49 on the valve stop insert 22. The surfaces 49 on the insert 22 and the grooves 41 in the inlet block 11 are positioned such that when the valve plates 43 are in the second or open position, the valve plates 43 form a continuous smooth wall connecting the ports 15' in the inlet block 11 and the ports 24 in the valve stop insert 22. Thus, a streamlined flow path is provided through the valve 10 to control velocity changes of fluid flowing through the valve 10 without sudden increases or decreases in velocity. As a consequence, turbulence in fluid flowing through the valve 10 is minimized to in turn minimize pressure drops across the valve 10. When fluid flow stops, the spring 40 causes the valve plates 43 to pivot in the grooves 41 to the first position wherein the ports 15' are closed and fluid flow in a reverse direction is inhibited through the valve 10. The forces required to pivot the valve plates 43 and frictional wear on the edges 44 of the valve plates 43 are reduced by forming the valve stop insert 22 from a self-lubricating material, such as carbon-filled tetrafluoroethylene (TFE). In addition, the valve spring 40 is tailored to produce the correct force for biasing each of the valve plates 43 towards the first or closed position.

Turning now to FIG. 5, a side elevational view of a fluid intake valve 60 is shown in partial section. The fluid intake valve 60 includes a valve inlet block 61 which abuts a valve outlet block 62 at a generally plainer interface 63. The block 61 and 62 are connected together by means of a plurality of bolts 64 passed through the inlet block 61 and threadibly engaging the outlet block 62. The valve outlet block 62 is provided with a shoulder 65 which is seated within a pocket 28B in the compressor head 28. It should be noted that the primary difference between intake valve 60 of FIG. 5 and the discharge valve 10 of FIGS. 1-4 is that the inlet and outlet blocks are reversed. The bolts 64 are passed through the inlet block 61 and threaded into the outlet block 62 and the bolts 14 were passed through the outlet block 12 and threaded into the inlet block 11 so that the bolt 64 and 14 lie outside the compression chamber in the compressor. This reduces the clearance required between a reciprocating piston in the compressor (not shown) and the intake and discharge valves 60 and 10 and also provides smooth surfaces within the compression chamber to minimize fluid turbulence within the compressor.

A plurality of pairs of ports 66 extend through the intake valve 60 for permitting fluid to flow through the valve 60 in a direction from the intake block 61 to the outlet block 62. For each pair of port 66, a valve stop insert 67 is mounted within a recess 68 in the valve inlet block 61. The valve stop insert 67 may be identical to the valve stop insert 22 shown in FIGS. 1-4. Each port in the pairs of ports 67 includes a port section 69 in the valve inlet block 60, a port section 70 through the valve stop insert 67 and a port section 71 through the valve outlet block 62. Each port section 69 in the valve inlet block 61 is aligned with an associated port section 70 through a valve stop insert 67 and a port section 71 through the valve outlet block 62. The ports are shaped to provide streamlined flow paths through the intake valve 60, and, preferably, the port section 69 and the port section 71 diverge slightly in an outwardly direction from the interface 63 to provide controlled velocity changes in fluid flowing through the valve 60. A retainer 72 is positioned within an annular groove 73 about the periphery of the valve inlet block 61 for retaining the valve stop insert 67 within the recesses 68, in a manner similar to that described above for the retainer 26.

A separate valve plate 74 normally is positioned to close each of the port sections 69 in the vale inlet block 61. The valve plates 74 each have an end 75 which pivots on a web 76 located between the two port sections 69 in each pair of ports 66. The valve plates 74 also have a second opposing edge 77 which sweeps across the valve stop insert 67 as the valve plate 74 pivots between a first position wherein the associated port section 69 is closed in a second position wherein the port section 69 is open. When in the second position, the valve plate 74 forms a streamlined portion of the wall of the port section 69 in the valve inlet block 61 to reduce turbulence in fluid flowing through the inlet valve 60.

A separate spring retainer 78 is positioned between each valve stop insert 67 and the adjacent web 76 of the valve inlet block 61. An elongated V-shaped spring 79 extends between the two valve plates 74 for each pair of ports 66. The spring 79 is positioned to extend over the spring retainer 78 and to exert simultaneous forces on the two valve plates 74 for each pair of ports 66 to bias such valve plates 74 to the first or closed position. As a consequence, fluid is inhibited from flowing from the port sections 71 in the valve outlet block 62 past the valve plates 74 and into the port sections 69 in the valve inlet block 61. However, when the compressor piston places a reduced pressure in the port sections 71 in the valve outlet box 62 during an intake or suction stroke, fluid is drawn from the valve port sections 69 in the inlet block 61 past the valve plates 74 which are deflected to the second or open position. From the valve inlet block 61, the fluid flows through the port sections 70 in the insert 67 and the port sections 71 in the valve outlet block 62 and into the compression chamber. As soon as the piston reaches the end of its suction stroke, fluid flow ceases and springs 79 force each of the valve plates 74 to the closed position. The direction of the reciprocating piston then reverses and the piston forces the fluid which was drawn through the intake valve 60 to flow through the discharger exhaust vale 10 associated with the compression chamber, as described above.

In the above-described preferred embodiments, the valve has been described interchangeably as a "one way" valve and as a "check" valve. Furthermore, the valve has been described primarily for use in a fluid compressor. However, it should be appreciated that the valve will function equally well in other applications in which it is desired to restrict fluid flow to a single direction in a passageway. Furthermore, the material from which the valve is constructed and the manner in which the valve is attached to the compressor, or other apparatus in which the valve is operated may be varied without departing from the spirit and the scope of the invention. It should also be appreciated that although the valve inlet block and the valve outlet block are shown connected together by means of three bolts, other means for connecting the inlet block and the outlet block together may be used.

What we claim is:

1. An improved one-way fluid valve construction comprising a valve housing including a valve inlet block and a valve outlet block having generally planar abuttin inner surfaces, means attaching said valve inlet block and said valve outlet block together with said inner surfaces abutting, a valve stop insert, opening means between said valve inlet block and said valve outlet block retaining said valve stop insert, said valve stop insert having two curved surface areas facing said valve inlet block, a pair of spaced ports each extending through said valve inlet block, said valve stop insert and said valve outlet block, first and second rigid valve plates, means supporting each of said valve plates in said valve inlet block between said ports for pivoting between first and second positions, said first valve plate closing one of said ports when in said first position and opening said one port when pivoted to said second position and said second valve plate closing the other of said ports when in said first position and opening said other ports when pivoted to said second position, said valve plates each having an edge which sweeps across a different one of said curved surface areas of said valve stop insert when pivoted, and spring means extending between said valve plates for simultaneously biasing both of said valve plates away from each other towards said first positions whereby said valve plates inhibit fluid flow in one direction through said ports.

2. An improved one-way fluid valve construction, as set forth in claim 1, and further including a a spring retainer extending from between said curved surface areas on said valve stop insert to between said valve plates and having an edge extending parallel to and spaced between said valve plates, and wherein said spring means extends between said valve plates and over said spring retainer edge.

3. An improved one-way fluid valve construction, as set forth in claim 2, wherein said valve stop insert includes shoulder means on each side of said spring retainer for preventing movement of said valve plates past said second positions.

4. An improved one-way fluid valve construction, as set forth in claim 3, wherein, when said valve plates are in said second positions, said valve plates form a continuous streamlined portion of the walls of said ports.

5. An improved one-way fluid valve construction, as set forth in claim 4, wherein the portion of said ports in said valve inlet block diverge outwardly away from said valve stop insert, and wherein the portion of said ports in said valve outlet block diverge outwardly from said valve stop insert.

6. An improved one-way valve construction, as set forth in claim 2, wherein said spring retainer is clamped between said valve stop insert and said valve inlet block and includes means spacing said spring retainer edge from said valve inlet block.

7. An improved one-way fluid valve construction as set forth in claim 2, wherein said spring means comprises a flat rectangular spring bent to define two elongated flat sides connected together at an elongated bight, and wherein said spring is positioned with said bight extending along said spring retainer edge and with said sides pressing against said valve plates.

8. An improved one-way fluid valve construction, as set forth in claim 1, wherein said valve stop insert includes means lubricating said two curved surface areas.

9. An improved one-way fluid valve construction, as set forth in claim 1, and including a plurality of said valve stop inserts retained in said opening means between said valve inlet block and said valve outlet block, wherein a separate pair of said spaced ports extends through said valve inlet block, each of said valve stop inserts and said valve outlet block, wherein first and second valve plates are supported in said valve inlet block for each of said pair of ports for pivoting between first positions wherein such pair of ports are closed and second positions wherein such pair of ports are open, and wherein a separate spring means is provided for each said pair of ports for simultaneously biasing said first and second valve plates for such pair of ports towards said first positions.

* * * * *